(12) United States Patent
Wu et al.

(10) Patent No.: US 11,340,200 B2
(45) Date of Patent: May 24, 2022

(54) ELECTROSPRAY ASSISTED CAPILLARY DEVICE FOR PROCESSING ULTRA LOW-VOLUME SAMPLES

(71) Applicant: The Board of Regents of the University of Oklahoma, Oklahoma City, OK (US)

(72) Inventors: Si Wu, Norman, OK (US); Lushuang Huang, Norman, OK (US); Zhe Wang, San Francisco, CA (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 17/194,539

(22) Filed: Mar. 8, 2021

(65) Prior Publication Data

US 2021/0278380 A1 Sep. 9, 2021

Related U.S. Application Data

(60) Provisional application No. 62/986,732, filed on Mar. 8, 2020.

(51) Int. Cl.
*G01N 30/72* (2006.01)
*H01J 49/16* (2006.01)

(52) U.S. Cl.
CPC ........ *G01N 30/7266* (2013.01); *H01J 49/167* (2013.01)

(58) Field of Classification Search
CPC ... G01N 30/7266; H01J 49/167; H01J 49/165
See application file for complete search history.

(56) References Cited

U.S. PATENT DOCUMENTS 5,423,964 A * 6/1995 Smith .............. G01N 27/44717
204/452
5,495,108 A * 2/1996 Apffel, Jr ........... G01N 30/7253
250/288

(Continued)

OTHER PUBLICATIONS

Actis, P.; Maalouf, M. M.; Kim, H. J.; Lohith, A.; Vilozny, B.; Seger, R. A.; Pourmand, N., Compartmental genomics in living cells revealed by single-cell nanobiopsy. ACS Nano 2014, 8 (1), 546-53.

(Continued)

*Primary Examiner* — Brooke Purinton
(74) *Attorney, Agent, or Firm* — Crowe & Dunlevy, P.C.

(57) ABSTRACT

A spray-capillary device is configured to process ultra low-volume samples. The spray-capillary device includes a spray capillary that includes an inlet end and a discharge end. The spray capillary includes a porous section at the discharge end. A downstream connector provides an interface between the porous section of the spray capillary, a conductive fluid, and a high voltage electrical source. The application of voltage to the downstream connector causes electrospray ionization, which can be used to draw ultra law volume samples into the inlet end. A gas injection assembly can be used to increase the pressure on the inlet end of the spray capillary to encourage movement of the sample through the spray capillary. The spray-capillary device is well suited for providing ultra low samples to a mass spectrometer detection device.

20 Claims, 13 Drawing Sheets

(56) References Cited

U.S. PATENT DOCUMENTS

| | | | | |
|---|---|---|---|---|
| 6,649,908 | B2* | 11/2003 | Apffel, Jr | G01N 30/7266 250/288 |
| 11,056,330 | B2* | 7/2021 | Silivra | H01J 49/26 |
| 11,117,131 | B2* | 9/2021 | Kaigala | B01L 3/502715 |
| 2002/0121598 | A1* | 9/2002 | Park | H01J 49/107 250/288 |
| 2005/0029442 | A1* | 2/2005 | Takats | H01J 49/167 250/281 |
| 2015/0233877 | A1* | 8/2015 | Dovichi | G01N 30/7266 250/282 |
| 2018/0088080 | A1* | 3/2018 | Dovichi | B01L 9/065 |
| 2020/0158703 | A1* | 5/2020 | Fukui | H01J 49/10 |
| 2021/0358734 | A1* | 11/2021 | Hasegawa | H01J 49/0422 |

OTHER PUBLICATIONS

Aerts, J. T.; Louis, K. R.; Crandall, S. R.; Govindaiah, G.; Cox, C. L.; Sweedler, J. V., Patch Clamp Electrophysiology and Capillary Electrophoresis-Mass Spectrometry Metabolomics for Single Cell Characterization. Anal Chem 2014, 86 (6), 3203-3208.

Altelaar, A. F.; Heck, A. J., Trends in ultrasensitive proteomics. Curr Opin Chem Biol 2012, 16 (1-2), 206-13.

Chen, A.; Lynch, K. B.; Ren, J.; Jia, Z.; Yang, Y.; Lu, J. J.; Liu, S., Tunable Electroosmosis-Based Femto-Liter Pipette: A Promising Tool toward Living-Cell Surgery. Anal Chem 2017, 89 (20), 10806-10812.

Choi, S. B.; Zamarbide, M.; Manzini, M. C.; Nemes, P., Tapered-Tip Capillary Electrophoresis Nano-Electrospray Ionization Mass Spectrometry for Ultrasensitive Proteomics: the Mouse Cortex. J Am Soc Mass Spectr 2017, 28 (4), 597-607.

Faserl, K.; Sarg, B.; Kremser, L.; Lindner, H., Optimization and Evaluation of a Sheathless Capillary Electrophoresis-Electrospray Ionization Mass Spectrometry Platform for Peptide Analysis: Comparison to Liquid Chromatography-Electrospray Ionization Mass Spectrometry. Anal Chem 2011, 83 (19), 7297-7305.

Gholipour, Y.; Erra-Balsells, R.; Hiraoka, K.; Nonami, H., Living cell manipulation, manageable sampling, and shotgun picoliter electrospray mass spectrometry for profiling metabolites. Anal Biochem 2013, 433 (1), 70-8.

Giddings, J. C., Unified separation science. Wiley New York etc: 1991.

Gomes, F. P.; Yates, J. R., 3rd, Recent trends of capillary electrophoresis-mass spectrometry in proteomics research. Mass Spectrom Rev 2019, 38 (6), 445-460.

Guillaume-Gentil, O.; Rey, T.; Kiefer, P.; Ibanez, A. J.; Steinhoff, R.; Bronnimann, R.; Dorwling-Carter, L.; Zambelli, T.; Zenobi, R.; Vorholt, J. A., Single-Cell Mass Spectrometry of Metabolites Extracted from Live Cells by Fluidic Force Microscopy. Anal Chem 2017, 89 (9), 5017-5023.

Honda, S.; Iwase, S.; Fujiwara, S., Evaluation of an automatic siphonic sampler for capillary zone electrophoresis. J Chromatogr A 1987, 404, 313-320.

Huang, E. L.; Piehowski, P. D.; Orton, D. J.; Moore, R. J.; Qian, W. J.; Casey, C. P.; Sun, X.; Dey, S. K.; Burnum-Johnson, K. E.; Smith, R. D., SNaPP: Simplified Nanoproteomics Platform for Reproducible Global Proteomic Analysis of Nanogram Protein Quantities. Endocrinology 2016, 157 (3), 1307-14.

Huang, X. H.; Coleman, W. F.; Zare, R. N., Analysis of Factors Causing Peak Broadening in Capillary Zone Electrophoresis. J Chromatogr 1989, 480, 95-110.

Kelly, R. T.; Tolmachev, A. V.; Page, J. S.; Tang, K.; Smith, R. D., The ion funnel: theory, implementations, and applications. Mass Spectrom Rev 2010, 29 (2), 294-312.

Krylov, S. N.; Starke, D. A.; Arriaga, E. A.; Zhang, Z. R.; Chan, N. W. C.; Palcic, M. M.; Dovichi, N. J., Instrumentation for chemical cytometry. Anal Chem 2000, 72 (4), 872-877.

Laforge, F. O.; Carpino, J.; Rotenberg, S. A.; Mirkin, M. V., Electrochemical attosyringe. Proc Natl Acad Sci U S A 2007, 104(29), 11895-900.

Lombard-Banek, C.; Moody, S. A.; Manzini, M. C.; Nemes, P., Microsampling Capillary Electrophoresis Mass Spectrometry Enables Single-cell Proteomics in Complex Tissues: Developing Cell Clones in Live Xenopus laevis and Zebrafish Embryos. Anal Chem 2019.

Masujima, T., Live Single-cell Mass Spectrometry. Analytical Sciences 2009, 25 (8), 953-960.

Mizuno, H.; Tsuyama, N.; Harada, T.; Masujima, T., Live single-cell video-mass spectrometry for cellular and subcellular molecular detection and cell classification. J Mass Spectrom 2008, 43 (12), 1692-1700.

Moini, M., Simplifying CE-MS operation. 2. Interfacing low-flow separation techniques to mass spectrometry using a porous tip. Anal Chem 2007, 79 (11), 4241-4246.

Morris, C. A.; Friedman, A. K.; Baker, L. A., Applications of nanopipettes in the analytical sciences. Analyst 2010, 135 (9), 2190-202.

Nemes, P.; Rubakhin, S. S.; Aerts, J. T.; Sweedler, J. V., Qualitative and quantitative metabolomic investigation of single neurons by capillary electrophoresis electrospray ionization mass spectrometry. Nat Protoc 2013, 8 (4), 783-99.

Onjiko, R. M.; Moody, S. A.; Nemes, P., Single-cell mass spectrometry reveals small molecules that affect cell fates in the 16-cell embryo. Proc Natl Acad Sci U S A 2015, 112 (21), 6545-50.

Onjiko, R. M.; Portero, E. P.; Moody, S. A.; Nemes, P., In Situ Microprobe Single-Cell Capillary Electrophoresis Mass Spectrometry: Metabolic Reorganization in Single Differentiating Cells in the Live Vertebrate (Xenopus laevis) Embryo. Anal Chem 2017, 89 (13), 7069-7076.

Prager, D. J.; Bowman, R. L.; Vurek, G. G., Constant volume, self-filling nanoliter pipette: Construction and calibration. Science 1965, 147 (3658), 606-608.

Rose, D. J.; Jorgenson, J. W., Characterization and Automation of Sample Introduction Methods for Capillary Zone Electrophoresis. Anal Chem 1988, 60 (7), 642-648.

Saha-Shah, A.; Weber, A. E.; Karty, J. A.; Ray, S. J.; Hieftje, G. M.; Baker, L. A., Nanopipettes: probes for local sample analysis. Chem Sci 2015, 6 (6), 3334-3341.

Saha-Shah, A.; Karty, J. A.; Baker, L. A., Local collection, reaction and analysis with theta pipette emitters. Analyst 2017, 142 (9), 1512-1518.

Shen, Y.; Tolic, N.; Masselon, C.; Pasa-Tolic, L.; Camp, D. G.; Hixson, K. K.; Zhao, R.; Anderson, G. A.; Smith, R. D., Ultrasensitive proteomics using high-efficiency on-line micro-SPE-NanoLC-NanoESI MS and MS/MS. Anal Chem 2004, 76 (1), 144-154.

Shen, Y. F.; Zhao, R.; Berger, S. J.; Anderson, G. A.; Rodriguez, N.; Smith, R. D., High-efficiency nanoscale liquid chromatography coupled on-line with mass spectrometry using nanoelectrospray ionization for proteomics. Anal Chem 2002, 74 (16), 4235-4249.

Shi, W.; Sa, N.; Thakar, R.; Baker, L. A., Nanopipette delivery: influence of surface charge. Analyst 2015, 140 (14), 4835-42.

Sun, L. L.; Zhu, G. J.; Zhao, Y. M.; Yan, X. J.; Mou, S.; Dovichi, N. J., Ultrasensitive and Fast Bottom-up Analysis of Femtogram Amounts of Complex Proteome Digests. Angew Chem Int Edit 2013, 52 (51), 13661-13664.

Sun, L. L.; Zhu, G. J.; Zhang, Z. B.; Mou, S.; Dovichi, N. J., Third-Generation Electrokinetically Pumped Sheath-Flow Nanospray Interface with Improved Stability and Sensitivity for Automated Capillary Zone Electrophoresis-Mass Spectrometry Analysis of Complex Proteome Digests. J Proteome Res 2015, 14 (5), 2312-2321.

Wilm, M. S.; Mann, M., Electrospray and Taylor-Cone Theory, Doles Beam of Macromolecules at Last. Int J Mass Spectrom 1994, 136 (2-3), 167-180.

Wilm, M. S.; Mann, M., Analytical properties of the nanoelectrospray ion source. Anal Chem 1996, 68 (1), 1-8.

Wohlfarth, C.; Wohlfahrt, B., 2 Pure Compounds: References. In Pure Organometallic and Organononmetallic Liquids, Binary Liquid Mixtures, Springer: 2001; pp. 144-149.

Wojcik, R.; Dada, O. O.; Sadilek, M.; Dovichi, N. J., Simplified capillary electrophoresis nanospray sheath-flow interface for high efficiency and sensitive peptide analysis. Rapid Commun Mass Sp 2010, 24 (17), 2554-2560.

(56) References Cited

OTHER PUBLICATIONS

Yang, Y.; Huang, Y.; Wu, J.; Liu, N.; Deng, J.; Luan, T., Single-cell analysis by ambient mass spectrometry. TrAC Trends in Analytical Chemistry 2017, 90, 14-26.

Yin, R. C.; Prabhakaran, V.; Laskin, J., Quantitative Extraction and Mass Spectrometry Analysis at a Single-Cell Level. Anal Chem 2018, 90 (13), 7937-7945.

Zhang, L. W.; Foreman, D. P.; Grant, P. A.; Shrestha, B.; Moody, S. A.; Villiers, F.; Kwake, J. M.; Vertes, A., In Situ metabolic analysis of single plant cells by capillary microsampling and electrospray ionization mass spectrometry with ion mobility separation. Analyst 2014, 139 (20), 5079-5085.

Zhang, L. W.; Vertes, A., Energy Charge, Redox State, and Metabolite Turnover in Single Human Hepatocytes Revealed by Capillary Microsampling Mass Spectrometry. Anal Chem 2015, 87 (20), 10397-10405.

Zhang, L.; Khattar, N.; Kemenes, I.; Kemenes, G.; Zrinyi, Z.; Pirger, Z.; Vertes, A., Subcellular Peptide Localization in Single Identified Neurons by Capillary Microsampling Mass Spectrometry. Sci Rep 2018, 8 (1), 12227.

Zhou, M.; Huang, C.; Wysocki, V. H., Surface-induced dissociation of ion mobility-separated noncovalent complexes in a quadrupole/time-of-flight mass spectrometer. Anal Chem 2012, 84 (14), 6016-23.

Zhu, Y.; Piehowski, P. D.; Zhao, R.; Chen, J.; Shen, Y. F.; Moore, R. J.; Shukla, A. K.; Petyuk, V. A.; Campbell-Thompson, M.; Mathews, C. E.; Smith, R. D.; Qian, W. J.; Kelly, R. T., Nanodroplet processing platform for deep and quantitative proteome profiling of 10-100 mammalian cells. Nat Commun 2018, 9.

Zhu, G.; Sun, L.; Dovichi, N. J., Thermally-initiated free radical polymerization for reproducible production of stable linear polyacrylamide coated capillaries, and their application to proteomic analysis using capillary zone electrophoresis-mass spectrometry. Talanta 2016, 146, 839-43.

* cited by examiner (A)

| Sample | Column liquid | |
|---|---|---|
| | Solution | Viscosity |
| Cyclohexane | 50% ACN in H$_2$O | 0.563 |
| 90% n-butanol in H$_2$O | H$_2$O | 0.891 |
| H$_2$O | 90% n-butanol in H$_2$O | 2.246 |

(B)

(A)

(B)

(C)

(B)

$$\text{Detection limit} = \frac{3 \times \text{analyte injection amount}}{S/N}$$

| Trials | S/N from BPC | | Detection limit (amol) | |
|---|---|---|---|---|
| | Syn-2 | AngII | Syn-2 | AngII |
| Replicate 1 | 459 | 116 | 19 | 75 |
| Replicate 2 | 465 | 106 | 19 | 82 |
| Replicate 3 | 703 | 236 | 12 | 37 |
| Average | 542.3 | 152.7 | 16.7 | 64.7 |

ELECTROSPRAY ASSISTED CAPILLARY DEVICE FOR PROCESSING ULTRA LOW-VOLUME SAMPLES

RELATED APPLICATIONS

This application claims the benefit of U.S. Provisional Patent Application Ser. No. 62/986,732 filed Mar. 8, 2020 entitled, "ELECTROSPRAY ASSISTED CAPILLARY DEVICE FOR PROCESSING ULTRA LOW-VOLUME SAMPLES," the disclosure of which is herein incorporated by reference.

STATEMENT REGARDING FEDERALLY SPONSORED RESEARCH OR DEVELOPMENT

This invention was made with government support under Contract Number AI141625 awarded by the National Institutes of Health (NIH). The government has certain rights in the invention.

BACKGROUND

There is interest, and practical value, in utilizing quantitative low-volume sample techniques in mass spectrometry (MS) imaging and microsampling applications. The analysis of low-volume samples provides valuable insight into complex biological systems. However, the proteomic and metabolomic analysis of low-volume samples remains challenging due to the lack of simple, efficient, and reproducible microsampling techniques.

Efforts have been made to improve the sensitivity and throughput of low quantity sample analysis in MS-based omics including the development of specialized sample preparation devices, high-resolution separation methods, efficient spray-MS interfaces (i.e., novel ambient ionization techniques), and advancements in MS instrumentation. The sensitivity of low quantity sample analysis has been dramatically improved using these techniques but many challenges remain in quantitative low-volume sample injection and extraction.

Micropipettes have been the most commonly applied tools for the manipulation of low-volume samples. Briefly, one end of the capillary tubing is pulled to make a micropipette to aspirate samples into the capillary through a driving force. Two approaches have been applied as the driving force for the operation of micropipettes: pump-based extraction and electro-osmotic flow (EOF)-based extraction. In the pump-based micropipette extraction, a syringe is connected to a vacuum or mechanical pump to pull the sample into a capillary. Using this method, low sample injection volume can be accurately controlled. Coupling the pump-based extraction approach with offline capillary electrophoresis-MS for complex sample analysis has been used to study live *Xenopus laevis* and Zebrafish embryos using a pump-based micropipette method. When an EOF-based method is utilized, an electrode is inserted into a sampling capillary and current is applied to induce electro-osmotic flow. Additionally, a micropipetting method based on electro-osmotic injection was developed and applied to the analysis of a single cell. During the collection process, +2 V was maintained to prevent the sample buffer from getting into the laser-pulled tips before the cell was penetrated. Low-volume cellular contents were extracted using −2 V after penetration. This work demonstrated that EOF could be utilized as the driving force for microsampling low-volume samples such as single onion cells. Another approach utilized an electro-osmotic pump for low-volume sample extraction from a Zebrafish embryo.

Other microsampling approaches include hydrodynamic methods, fluidic force microscopy, capillary force, and electrowetting. A microfluidic chip-based platform, nanoPOTS, has been developed for low-volume sample processing in single-cell proteomics analysis. NanoPOTS reduces total processing volumes from the conventional hundreds of microliters to <200 nL within a single droplet reactor. However, a customized automated droplet-based microfluidic system must be incorporated for the low-volume manipulation in nanoPOTS.

Continuous electrospray has been demonstrated using a platinum wire inserted into a laser pulled glass capillary with pre-injected samples. Additionally, researchers have proposed a sheathless interface to generate continuous electrospray for MS detection.

As discussed above, numerous methods have been previously proposed for improving microsampling techniques. While improvements have been made, current systems lack the ability to quantitatively manipulate ultra low-volume samples. The design of simple, efficient, reproducible microsampling techniques have been a challenge. The currently available designs result in considerable sample loss; require complicated, often proprietary equipment configurations; and cannot be directly coupled with downstream separation techniques such as liquid chromatography (LC) and capillary electrophoresis (CE).

The novel electrospray-assisted device of the present disclosure addresses the deficiencies of the previously proposed ultra low-volume sample extraction methods.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

DETAILED DESCRIPTION

Figure 1:
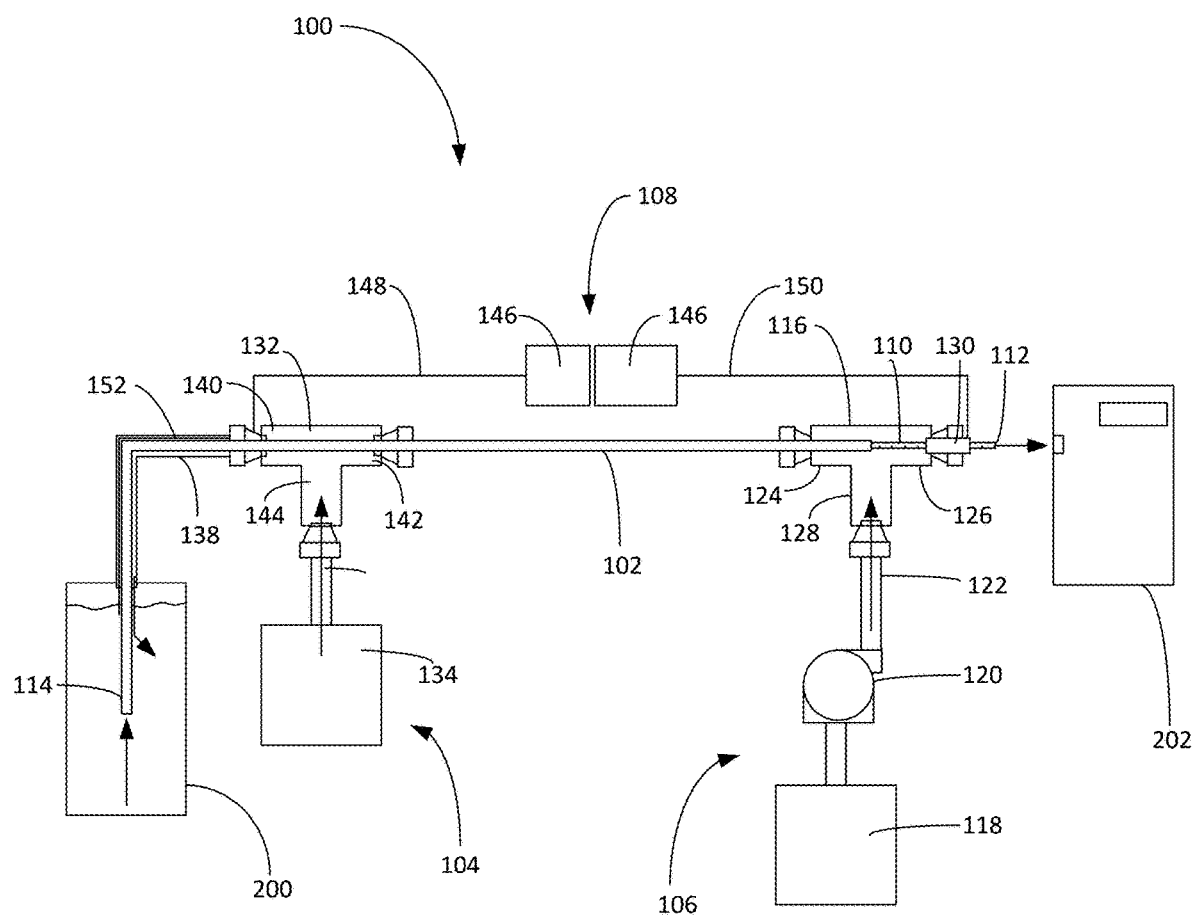
FIG. 1 shows a schematic of the overall spray-capillary device configured for compound detection and/or separation.

The analysis of ultra low-volume samples provides valuable insight into complex biological systems. However, the proteomic and metabolomic analysis of such samples has remained challenging due to the lack of simple, efficient, and reproducible microsampling techniques. The present disclosure is directed to an electrospray-assisted ("spray-capillary") device for quantitative low-volume sample extraction. The spray-capillary device enables reproducible and quantitative microsampling with low injection flow rates (e.g., as low as 15 pL/s). Stable electrospray is achieved through a chemically etched tip from a long (e.g., 50 cm) capillary with a conductive sheath flow. The results can be replicated with capillaries longer than 50 cm. This method is effective for capillaries between 10 cm to 200 cm. This electrospray provides the driving force to quantitatively draw low-volume samples into the capillary. Unlike prior technologies, the spray-capillary device can be directly coupled with capillary electrophoresis (CE) and/or other liquid chromatography separation techniques without any additional device(s). The spray-capillary device can be used, for example, for high-throughput quantitative omics analysis of ultra low-volume samples such as single cells.

Before describing various embodiments of the present disclosure in more detail by way of exemplary description, examples, and results, it is to be understood that the present disclosure is not limited in application to the details of methods and compositions as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure.

A reference to fractions of liters, such as 1 pL to 100 µL is intended to explicitly include all quantities in the range, such as 10 pL to 1 µL. Where used herein, the term ultra low-volume sample refers to a sample having a volume in a range of 15 pL to 25 nL.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" and "approximately" are used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. The use of the term "about" may mean a range including ±10% of the subsequent number unless otherwise stated.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein any reference to "we" as a pronoun herein refers generally to laboratory personnel or other contributors who assisted in the laboratory procedures and data collection and is not intended to represent an inventorship role by said laboratory personnel or other contributors in any subject matter disclosed herein.

Figure 4:
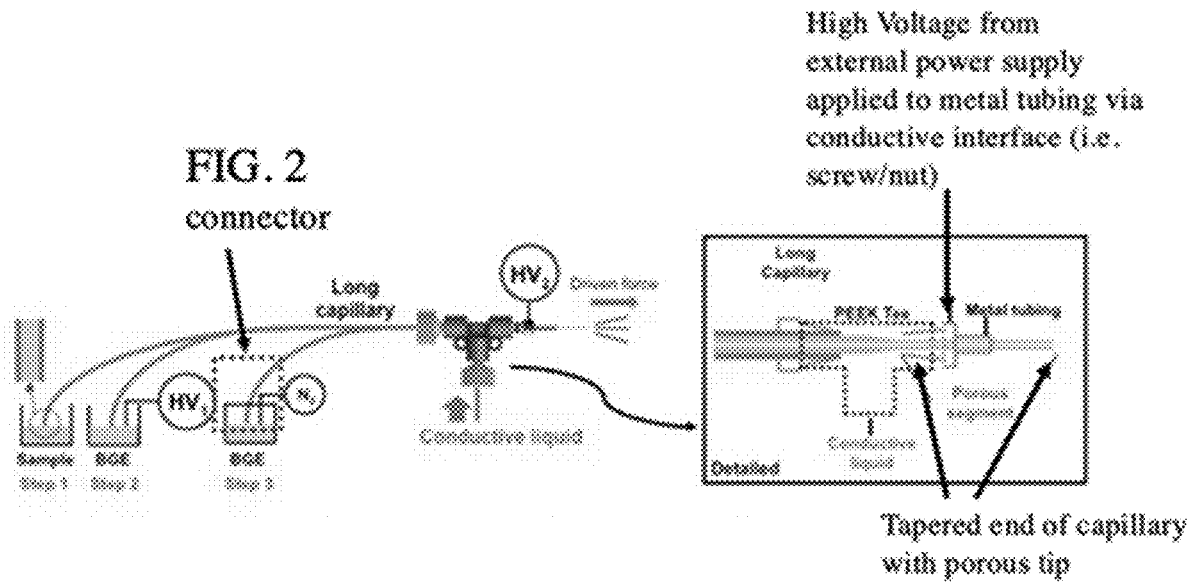
FIG. 4 shows a functional schematic of the overall spray-capillary device configured for compound detection and/or separation.
Figure 5:
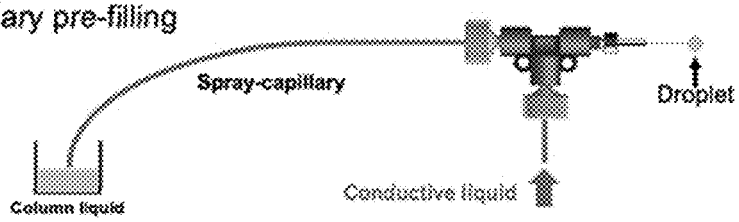
FIG. 5 shows a functional schematic of three steps for using the spray-capillary sample injection platform for MS detection.
Figure 5:
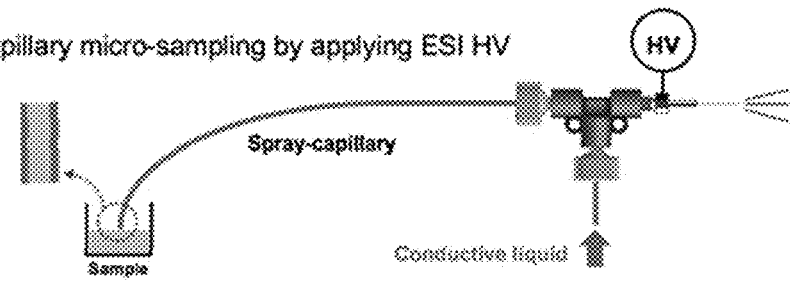
Figure 5:
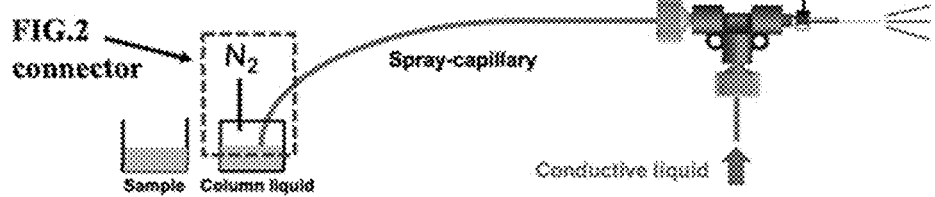

Turning to FIG. 1, shown therein is a depiction of one embodiment of a spray-capillary device 100. In this embodiment, the spray-capillary device 100 employs capillary electrophoresis (CE) and electrospray ionization (ESI) to drive low-volume samples from a container 200 to a detection device 202, such as a mass spectrometer (MS). The container 200 can include a sample, background electrolytes (BGE), column liquids, buffer liquids, or other fluids intended to be processed through the spray capillary 102. As illustrated in FIGS. 4 and 5, it will be understood that multiple containers 200 may be involved in the operation of the spray-capillary device 100. The spray-capillary device 100 includes a spray capillary 102, a gas injection assembly 104, a liquid injection assembly 106, and a voltage generator assembly 108.

The spray capillary 102 includes a porous section 110 at the discharge end 112, which may also be referred to as the "MS end." The porous section 110 acts as a spray nozzle through the discharge end 112. The spray capillary 102 also includes an inlet end 114 on the opposite end of the spray capillary 102 from the discharge end 112. The inlet end 114 may also be referred to as the "sample end." The inlet end 114 can be placed into the container 200. The preparation of the spray capillary 102, and in particular the preparation of the porous section 110, is described in detail below.

The liquid injection assembly 106 includes a downstream connector 116, a source of conductive liquid 118, a conductive liquid pump 120, and a liquid injection line 122. The liquid pump 120 can be a syringe, a small pump, or an arrangement in which gravity forces the conductive fluid to move from the source of conductive liquid 118 to the downstream connector 116 through the liquid injection line 122. As better illustrated in FIG. 2, the downstream connector 116 includes a first branch 124, a second branch 126, and a third branch 128. In exemplary embodiments, the downstream connector 116 is configured as "tee" connector that is manufactured from a suitable polymer, such as PEEK. The spray capillary 102 enters the downstream connector 116 at the first branch 124 and exits the downstream connector 116 through the second branch 126.

The porous section 110 of the spray capillary 102 extends from inside the downstream connector 116 through the second branch 126 toward the discharge end 112. In this way, conductive liquid inside the downstream connector 116 is permitted to enter the spray capillary 102 through the porous section 110. A metal sleeve 130 can be positioned over, or adjacent to, a portion of the porous section 110 to impose an electrical charge on the fluids within the spray capillary 102. The metal sleeve 130 is an example of a "conductive interface" on the downstream connector 116.

The gas injection assembly 104 includes an upstream connector 132, a source of pressurized gas 134, and a gas injection line 136, and a gas transfer line 138. As better illustrated in FIG. 3, the upstream connector 132 includes a first branch 140, a second branch 142, and a third branch 144. In exemplary embodiments, the upstream connector 132 is configured as "tee" connector that is manufactured from a suitable polymer, such as PEEK. The gas injection line 136 extends from the source of pressurized gas 134 to the third branch 144 of the upstream connector 132. The gas can be nitrogen or another inert gas. The gas is carried from the upstream connector 132 to the container 200 through the gas transfer line 138, which is secured to the first branch 140 of the upstream connector 132. In exemplary embodiments, the gas transfer line 138 connects to the container 200 in a sealed manner to prevent the release of pressure within the container 200. In certain embodiments, as depicted in Step 1 of FIG. 5, it may not be necessary to use the gas injection assembly 104, or to only use the gas injection assembly 104 for a portion of the sample processing operation.

In exemplary embodiments, the inlet end 114 of the spray capillary 102 is immersed within a fluid in the container 200. The spray capillary 102 then passes in a coaxial manner inside the gas transfer line 138 through the first branch 140 and second branch 142 of the upstream connector 132. The spray capillary 102 extends from the second branch 142 of the upstream connector 133 into the first branch 124 of the downstream connector 116, where the porous section 110 is positioned to admit conductive liquid entering the downstream connector 116 from the liquid injection assembly 106. The spray capillary 102 exits the downstream connector 116 through the second branch 126 and the metal sleeve 130. The discharge end 112 of the spray capillary 102 is optimally located in close proximity to the detection device 202.

Figure 2:
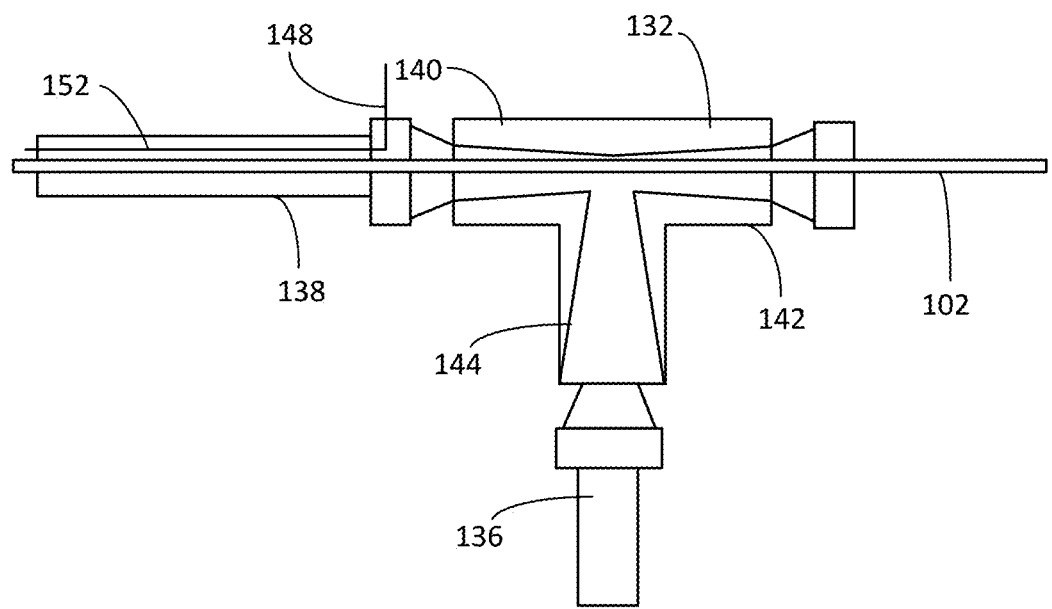
FIG. 2 depicts the first connector, which is part of the gas injection assembly.
Figure 3:
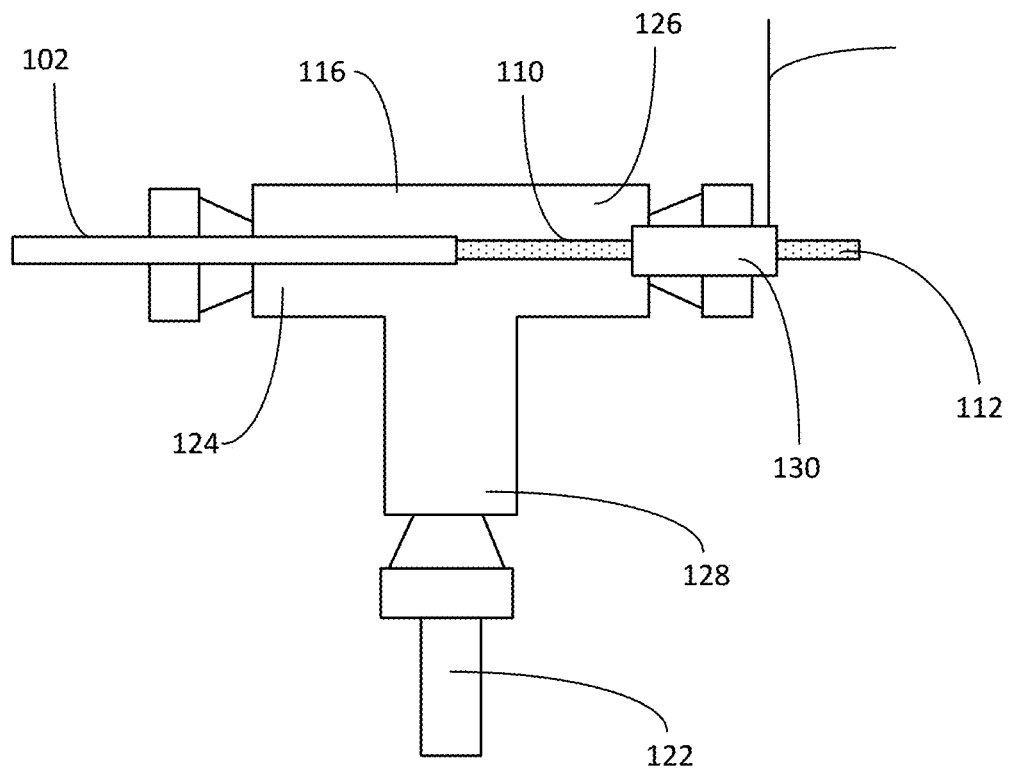
FIG. 3 depicts the second connector, which is part of the of the conductive fluid injection assembly.

The voltage generator assembly 108 includes the metal sleeve 130, a voltage source 146, a first lead 148, a second lead 150, and an upstream lead 152. The voltage source 146 provides a suitable electrical potential. The first lead 148 connects a first side (either positive or negative) of the voltage source 146 to the first branch 140 of the upstream connector 132. The first lead 148 is connected to the upstream lead 152, which extends from the first branch 140 to the container 200. In exemplary embodiments, the upstream lead 152 extends inside the gas transfer line 138. The second lead 150 connects the second side of the voltage source 146 (oppositely charged from the first side) to the downstream connector 116. In exemplary embodiments, the second lead 150 is connected between the second side of the voltage source 146 and the metal sleeve 130. In this way, an ionizing voltage can be applied to fluid in the spray capillary 102 from the inlet end 114 in the container 200 to the portion of the spray capillary 102 extending through the metal sleeve 130 in accordance with established electrospray ionization (ESI) principles. It will be appreciated that FIGS. 1-3 are not drawn to scale and are merely intended to provide a functional description of the various components within the spray-capillary device 100.

During the ESI process, a liquid jet is created when the electrostatic force of the column liquid overcomes the surface tension, which reduces the pressure around the discharge end 112 (spray tip) and creates a pressure difference between opposing ends of the spray capillary 102. The pressure difference varies based on the experimental set-up, but can be estimated using Poiseuille's Law. For example, for a 50 cm, 50 µm inner diameter spray-capillary device, the difference is 0.068 psi when 4 kV is used as the voltage and water is used as the column liquid.

The spray-capillary device 100 utilizes this pressure difference to serve as the driving force to move the liquid inside the spray capillary 102 towards the discharge end 112. The conductive porous section 110 was utilized to generate ESI as the driving force to quantitatively draw low-volume samples into the long capillary (e.g., 50 cm). FIGS. 4 and 5 show the spray-capillary device 100 platform and detailed diagram of the sheathless CE-MS interface with the detection device 202. Furthermore, the sample inlet end 114 of the spray capillary 102 can be directly inserted into a background electrolyte (BGE) solution after sample injection for online CE-MS analysis, which further increases the high-throughput omics analysis of ultra low-volume samples.

In some embodiments, the gas injection assembly 104 is used simultaneously with the electrospray ionization (ESI) made possible by the liquid injection assembly 106 and voltage generator assembly 108. In other embodiments, the electrospray ionization function begins before activation of the gas injection assembly 104, but is later disabled once the gas injection assembly 104 has been activated. In other embodiments, the gas injection assembly 104 is used before activation of the electrospray ionization function. In yet other embodiments, the electrospray ionization is used in isolation (as illustrated in Step 1 of FIG. 5), while in other embodiments the gas injection assembly 104 is used in isolation. In yet other embodiments, the gas injection assembly 104 and electrospray ionization function are activated and deactivated multiple times during a sampling process.

The present disclosure is directed to ultra low-volume sampling method for use with mass spectroscopy. The application of the microsampling method of the present disclosure is not limited to mass spectroscopy detection. The disclosed sampling method an be utilized for ultra low-volume and low-volume microsampling analyzed with other detection and imaging methods. The device and method disclosed, in one embodiment, is configured to be directly coupled with a MS as the CE-MS platform used for the analysis of chemical compounds, biochemical on biological samples (i.e., tissues, saliva samples, serum samples etc.), the analysis of single cells, ultra low-volume samples, and the detection and analysis of chemicals (e.g., metabolites, proteins and peptides) in solvent mixtures or low volume fractions from other separation methods such as nano-LC.

EXAMPLES

The present disclosure will now be discussed in terms of several specific, non-limiting, examples. The examples described below, which include particular embodiments, will serve to illustrate the practice of the present disclosure, it being understood that the particulars shown are by way of example and for purposes of illustrative discussion of particular embodiments of the present disclosure only and are presented in the cause of providing what is believed to be a useful and readily understood description of construction procedures as well as of the principles and conceptual aspects of the inventive concepts.

Example 1—Sample Injection

In at least one embodiment, the spray-capillary device 100 is configured to perform quantitatively-controlled, evenly drawn microsamples, from ultra low-volumes. One non-limiting example of how the disclosed device is fabricated is by using the spray capillary 102, commercially-available sample vials 200, and standard electric wire for the first lead 148, second lead 150 and upstream lead 152 (see FIGS. 1 and 4-5). The chemicals, reagents and capillaries used in the development of the spray-capillary device 100 include, in one non-limiting embodiment, Angiotensin II (AngII, A9525), Syntide 2 (Syn-2, SCP0250), HPLC water (270733), ACS-reagent Acetonitrile (ACN, 360457), formic acid (FA) (≥95%, F0507), and hydrofluoric acid (HF, ≥48%, 30107) purchased from Sigma-Aldrich. Fused-silica capillaries were purchased from Polymicro Technologies. AngII and Syn-2 stock solutions were prepared in HPLC water. The standard peptide mixture used in the described embodiment was a solution of 10 µM AngII and 10 µM Syn-2 (0.1% FA in 45% ACN in water).

The spray capillary 102 may be modified by a similar technique used to fabricate some sheathless interfaces, but the design parameters of the disclosed spray-capillary device are modified specifically to achieve quantitative control for microsampling applications. One of the key points in the design and development of the spray capillary design is the porous section 110 which allows for the creation of the electrospray as a stable and controllable pulling source for quantitatively handling ultra low-volume samples. In addition, a sample pulled into the spray-capillary can be directly analyzed without additional unions connected to it, which results in decreased sample loss. The tip of the porous section 110 is shaped specifically for microsampling, so that even single cell samples can be retrieved.

Spray-Capillary Device Design

To produce precise, clean and reproducible interfaces, both the discharge end 112 and sample inlet end 114 of the spray capillary 102 were cut using a Shortix™ capillary column cutter, and were evaluated using an inverted microscope. Briefly, the outside polymer coating of the discharge end 112 (about 3 cm) was removed by flame. The exposed silica was etched using a 49% HF solution at room temperature to generate the porous section 110 for electric contact. During the etching process, the spray capillary 102 was continuously flushed with water at a flow rate of 0.2-0.4 µL/min to prevent etching of the inner wall by the HF solution.

After etching, the width of the spray capillary 102 wall was approximately 5 µm in one embodiment. The tip shape and porous condition of the porous section 110 were evaluated using an inverted microscope. The discharge end 112 of the spray capillary 102 was inserted into the downstream connector 116 through the metal sleeve 130, which was constructed from stainless steel (4 cm, 1/16" O.D., 0.04" I.D.) so that some portion of the porous section 110 (e.g., about 1.5 cm) emerged from the metal sleeve 130. A continuous flow of conductive liquid (0.1% FA, 1 µL/min) driven by the syringe pump 120 was introduced into the third branch 128 of the downstream connector 116 to create the electric contact for generating ESI. The ESI voltage was applied to the stainless steel metal sleeve 130 through an alligator clip.

In the experimental set-up of this embodiment, a sheathless interface is used to apply the voltage to the metal sleeve 130. The second lead 150 electrical wire is connected to the high voltage supply 146 with an alligator clip connected to a screw which interacts with a metal conductive unit, a nut in this example, to transmit the voltage signal from the power supply to the metal sleeve 130, as shown in FIGS. 1 and 4-5. The sample inlet end 114 of the spray capillary 102 was either placed directly into a sample vial 200 for sample injection, as seen in steps 1 and 2 of FIG. 5, or into a BGE vial 200 using the second upstream connector 132, shown in Step 3 of FIG. 5. As explained above, the second upstream connector 132 of FIG. 2 has a gas inlet (third branch 144) to help control the flow rate, and the upstream lead 152, a metal wire in this example, is used to apply high voltages for CE separation. The upstream lead 152 is held in place by a gasket, and is extended into the BGE vial 200 adjacent to the tip of the inlet end 114 that is also immersed in the BGE solution. The voltage is applied to the upstream connector 132 from the electrical source 146 via an alligator clip attached to the metal sleeve 130 extending perpendicular to the downstream connector 116. The power source used for the BGE solution is separate, or at least requires a separate output, from the power supply 146 used for the downstream connector 116 of the spray-capillary device 100.

Development and Characterization of the Spray-Capillary Device

Figure 7:
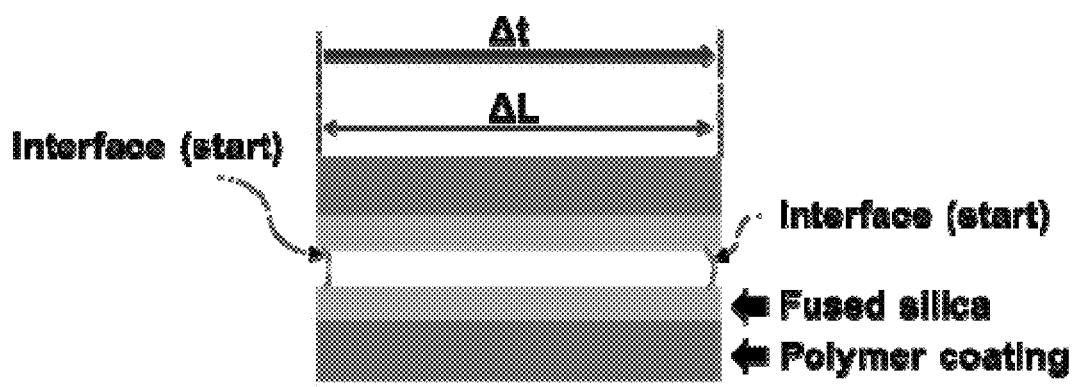
FIG. 7 shows a sample injection flow rate estimation using a camera-monitoring approach.
Figure 8:
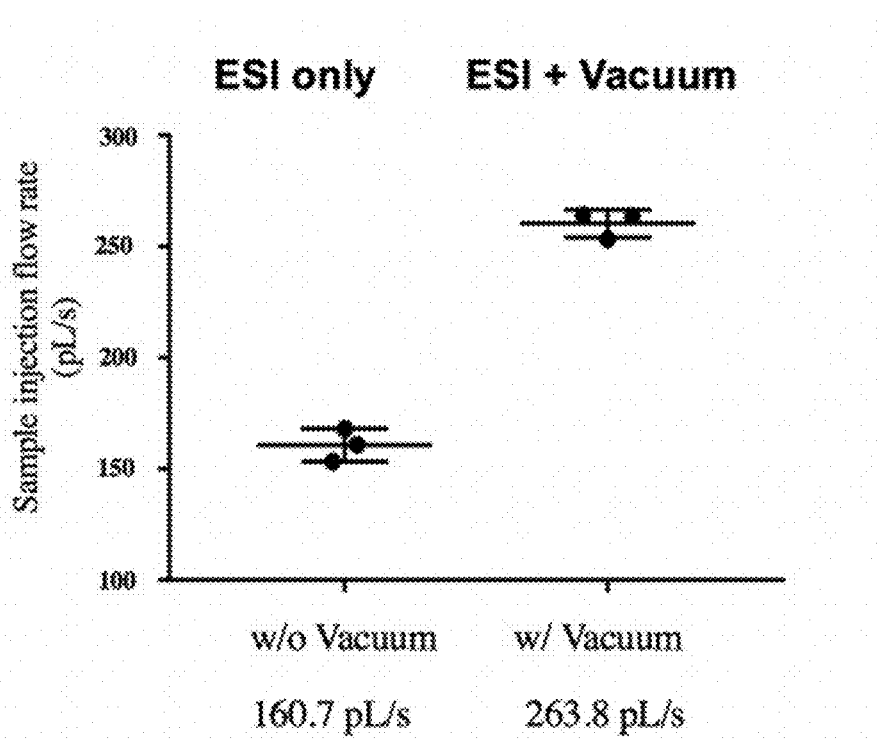
FIG. 8 shows the effect of vacuum force on the spray-capillary performance.

The spray-capillary device 100 embodiment described herein can be utilized to generate continuous ESI. For example, before sample injection, the sample inlet end 114 of the spray-capillary was placed in the sample vial 200 with the conductive liquid (0.1% FA). Low-pressure nitrogen was introduced into the sample vial 200, via the upstream connector 132 shown in FIG. 2, to fill the spray capillary 102 a droplet was observed at the discharge end 112. Then the sample inlet end 114 of the long 102 capillary was immersed in the sample vial 200 with standard peptide samples; the sample injection process was initiated by application of high voltage on the downstream connector 116 to generate continuous ESI as shown in FIGS. 1 and 4-5. The sample-injection flow rate was monitored and recorded using a digital camera. A segment of the polymer coating on the sample inlet end 114 of the spray capillary 102 was removed by flame so that the spray capillary 102 was transparent, and the contents could be visually observed. For the proof-of-principle experiments, $H_2O$ was used as the column liquid and an organic solution (90% n-butanol) was used as sample so a clear boundary could be observed. The sample injection flow rate was calculated by recording the migration time of the sample/column liquid interface movement in the spray capillary 102 as seen in FIG. 7.

Figure 14:
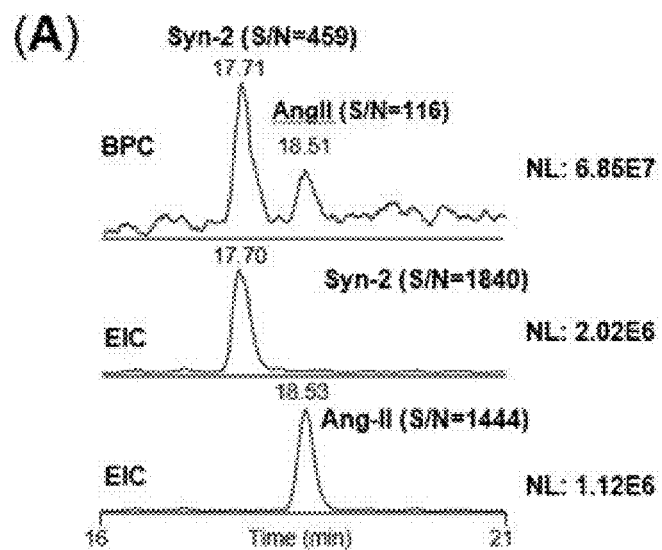
FIG. 14 shows evaluation of the detection limit of the spray-capillary sample injection for CE-MS. (A) An example of online peptide separation of Syn-2 and AngII (3 kV ESI voltage and 5 s sample injection time). (B) Calculated detection limits of Syn-2 an AngII based on the EICs using equation indicated above figure.

A 50 cm spray-capillary (360 µm O.D.×50 µm I.D.) was used for proof-of-concept experiments, although the length of the capillary tube is not limited to this length. Initially, to determine the primary driving force for sample injection into the spray-capillary device, a grounded copper plate was used as the spray target instead of the MS inlet to eliminate the vacuum force from the MS inlet capillary of the detection device 202. The sample injection flow rate was estimated using the aforementioned monitoring method ($H_2O$ as the column liquid). The results, shown in FIG. 14, indicate that ESI can be used alone as the driving force for sample injection, with an injection flow rate of 160.7 pL/s. The vacuum of the inlet of the detection device 202 can increase the sample injection flow rate to about 263.8 pL/s. However, the vacuum from the MS inlet alone does not initiate the injection procedure as there was no obvious movement of the sample boundary observed under the camera.

Figure 6A:
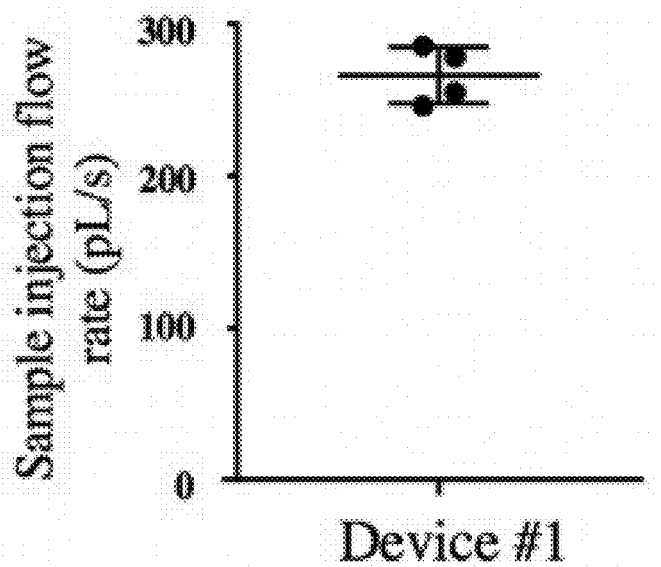
FIG. 6A shows sample injection results and demonstrated reproducibility for run-to-run.
Figure 6B:
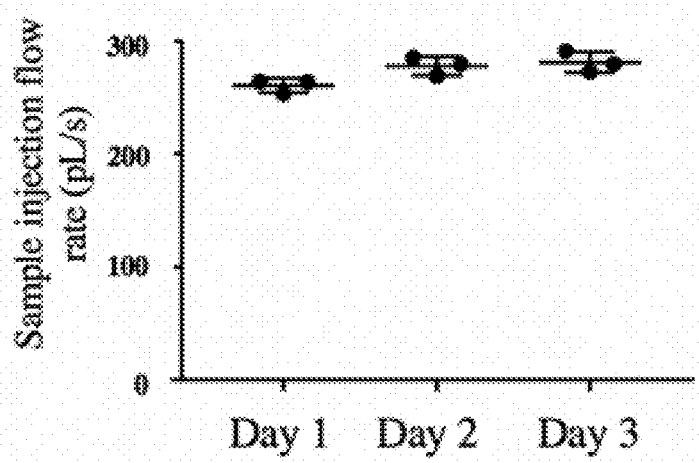
FIG. 6B shows sample injection results and demonstrated reproducibility for day-to-day.
Figure 6C:
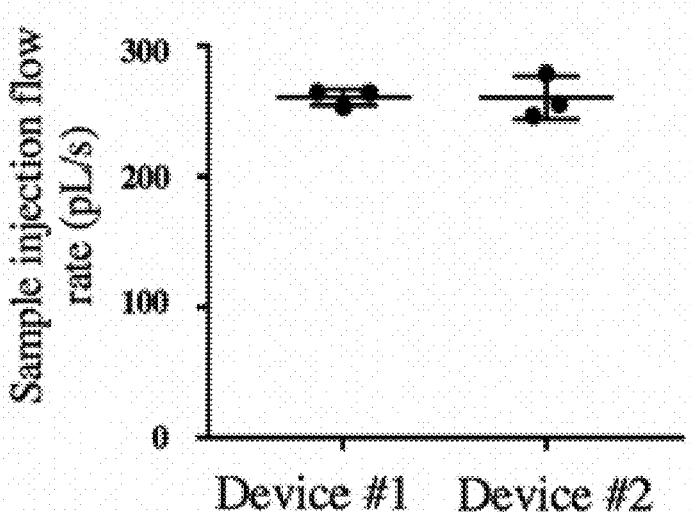
FIG. 6C shows sample injection results and demonstrated reproducibility for batch-to-batch sample injections.

The reproducibility of sample injection was further evaluated using the same spray-capillary and using reproductions. The 50 cm spray-capillary (360 µm O.D.×50 µm I.D.) was used with the injection voltage of 4 kV. The 50 cm capillary length and the 4 kV injection voltage are not limiting parameters. The length of the spray capillary 102 can be between 10 cm to 200 cm and the working injection voltage is 2.6 kV to 4 kV. Four individual sample injections were evaluated using the same capillary and conditions. The average sample injection flow rate in this capillary was estimated to be 255.2 pL/s and an RSD value of 4.9% was obtained demonstrating reasonable reproducibility was evaluated among runs as seen in FIG. 6A. Similarly, the day-to-day reproducibility and calculated an RSD of 3.29% shown in FIG. 6B. Triplicate experiments were also performed using two different spray-capillaries 102 to determine batch-to-batch reproducibility, which yielded an RSD value of 5.8% shown in FIG. 6C.

Figure 9:
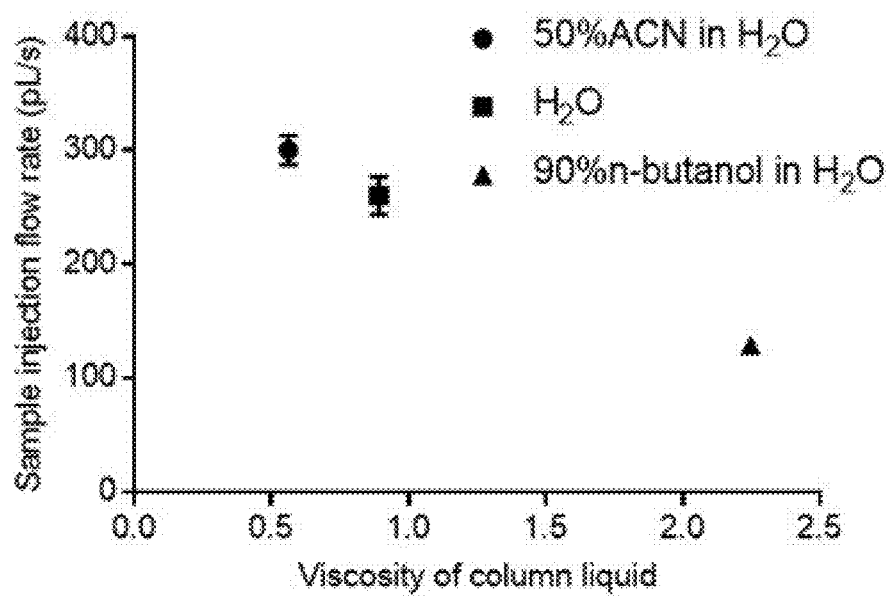
FIG. 9 shows (A) the effect of the viscosity of column liquid on the spray-capillary performance, and (B) the injection flow rated plotted against the viscosity for the three types of column liquid used.

The effect of the viscosity of the column liquid on injection flow rate was also tested to evaluate the influence of friction on liquid motion in the capillary. For evaluation, three types of column liquids with different viscosities ($H_2O$, 50% ACN, 90% n-butanol, theoretical viscosities listed in FIG. 9) were evaluated using the spray-capillary device 100; injection flow rates were calculated. Samples were chosen so that a clear boundary could be observed between the column liquid and the sample shown in FIG. 9(A). The results in FIG. 5(B) suggested an inverse proportionality between flow rate and viscosity such that higher sample injection flow rates were observed for low viscosity column liquids. The increase in friction of the higher viscosity liquid may result in slower liquid motion, as suggested by Poiseuille's law.

Figure 12:
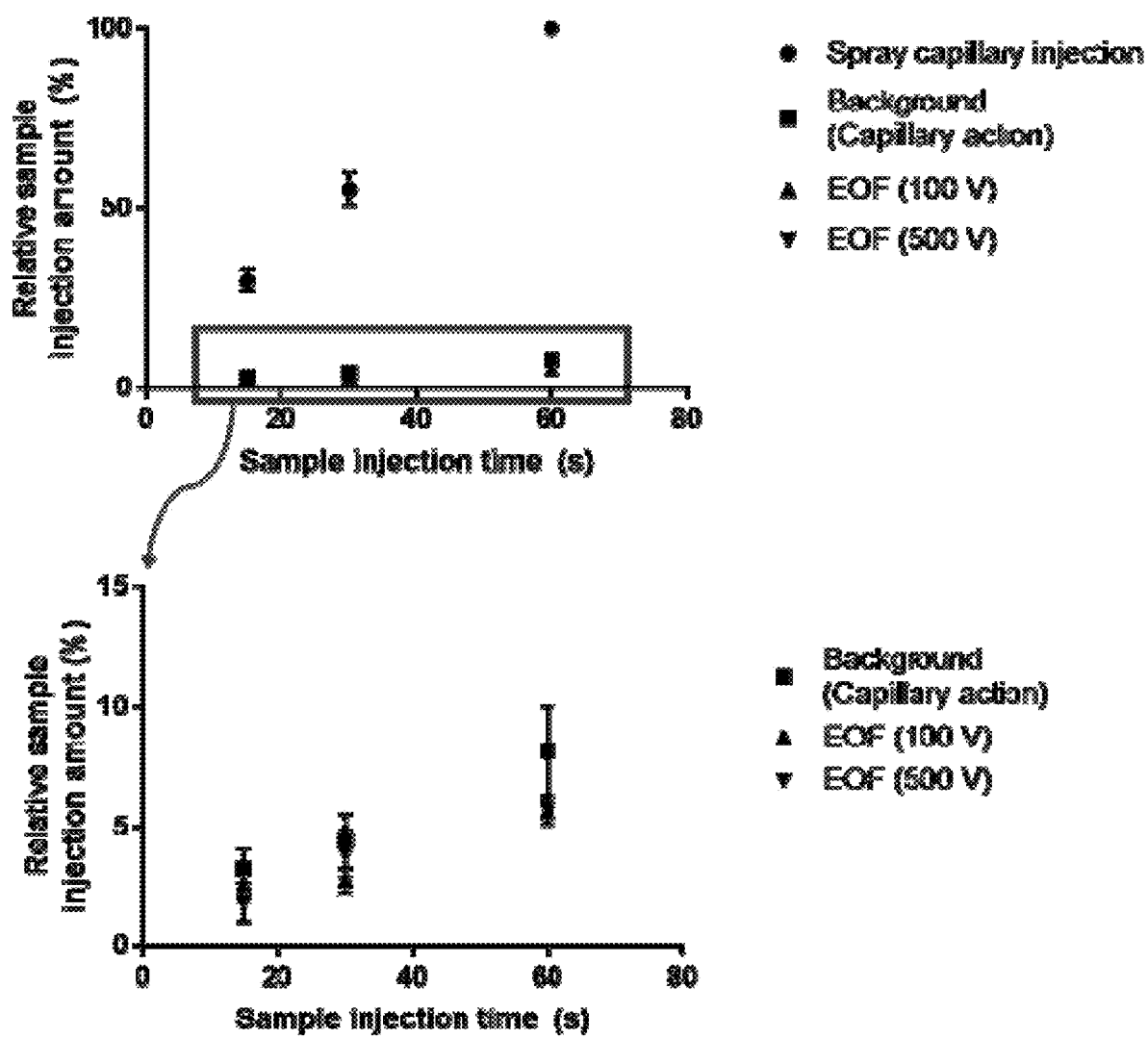
FIG. 12 shows an evaluation of the influence of random injection force (e.g., capillary action or sample adherence to the sample inlet surface) and the EOF effect on the spray capillary injection.

Other factors that may affect the spray-capillary injection process such as EOF, capillary action, and sample adherence to the surface were evaluated based on the following set of experiments (FIG. 12). (1) Background experiments (evaluation of random sample injection such as capillary action or sample adherence to the surface): the sample inlet end of spray-capillary was inserted into sample vials (10 s, 30 s, 60 s, N=3) with no voltage applied; (2) EOF experiments (evaluation of the effect of EOF on sampling): the sample inlet end of the spray-capillary was inserted into sample vials (10 s, 30 s, 60 s, N=3) with the application of 100 and 500 V. These voltage values were chosen because no electrospray is formed under these conditions. This experiment can provide us with a quantitative measurement of EOF during the injection, if any EOF exists. The capillary action or sample adherence to the surface does contribute a relatively small amount of the sample that is injected into the capillary during the spray-capillary process (less than 10%). The EOF effect on the tip contributes minimally to the sample injection process. Overall, the results suggest that ESI is the main driving force for the spray-capillary experiments and EOF by itself does not significantly affect the sample aspiration.

Example 2—Sample Injection and MS Detection

In another embodiment, the present disclosure provides characterization of the spray-capillary device 100 coupled with MS detection. For example, experiments determined the feasibility of the spray capillary 102 to be directly coupled with MS for quantitative sample injection and analysis. After the sample injection, a pressure-based sample elution step was incorporated to flush the sample through the spray capillary 102 for MS detection. Briefly, nitrogen (~2.5 psi) was introduced into a glass sample vial 200 filled with column liquid (0.1% FA in 45% ACN) using the pressure-based upstream connector 132 (FIG. 2). For MS detection, 2.3~2.6 kV was used for the electrospray ionization on the metal sleeve 130 of the sheathless interface of the downstream connector 116.

Figure 10:
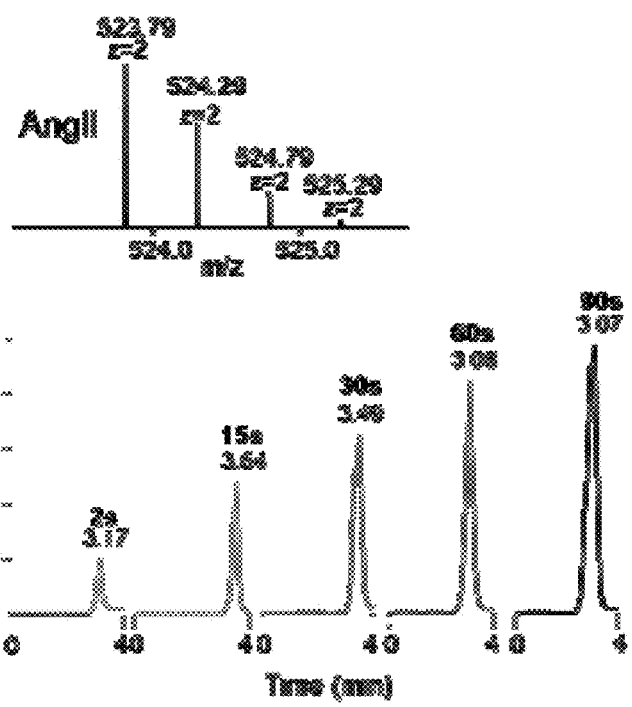
FIG. 10 shows quantitative results of a spray-capillary device coupled with MS for sample injections. (A) EICs of AngII (m/z=523.77–523.80) were evaluated with different injection times. (B) Calibration curve was constructed as a function of injection time (N=3 for each experiment condition). (C) The injection reproducibility was demonstrated here using three replicated injections with 60 s injection times using the EICs of AngII (m/z=523.77–523.80).
Figure 10:
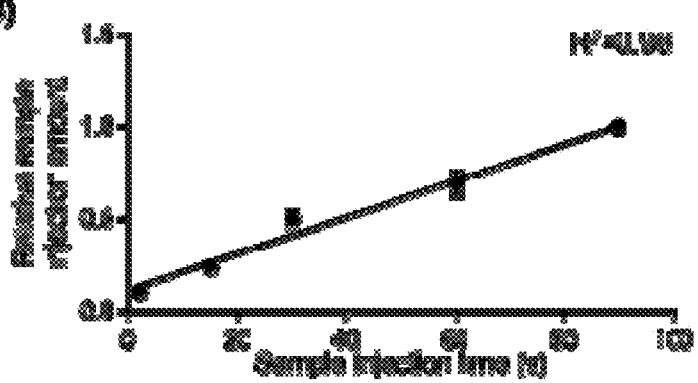
Figure 10:
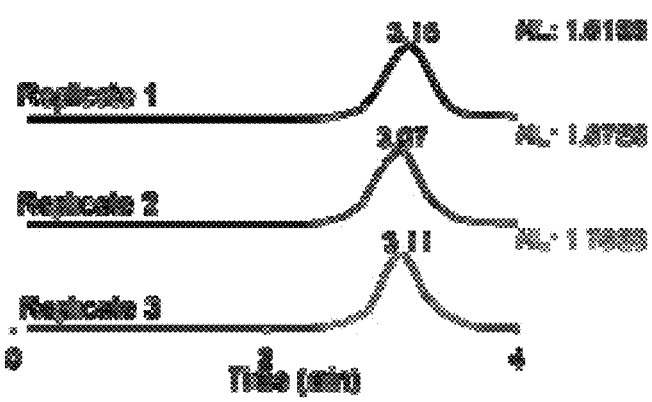

A 100 µM solution of AngII (0.1% FA in 45% ACN) was used to characterize the quantitative microsampling ability using the spray-capillary device 100 (360 µm O.D., 50 µm I.D., 50 cm in length) when coupled with MS detection. Sample was injected into the spray-capillary 102 using an ESI voltage of 4 kV for 2, 15, 30, 60, and 90 s (FIG. 6(A)). An injection time correlation plot (FIG. 10(B)) was constructed based on the integrated peak areas of extracted ion chromatograms (EICs) of AngII 2+ ions. Good linearity ($R^2$=0.98) indicates the method is quantifiable for a wide range of injection times. The total injection volume ranges from 520 pL to 23.7 nL, which was estimated based on our pre-calculated capillary flow rates (~260 pL/s) from camera monitoring. We also evaluated the reproducibility of the spray-capillary device 100 coupled with MS detection. Triplicate experiments with 60 s injection time were demonstrated in FIG. 10(C) with an average RSD value of 5.79%, which is comparable to the previous camera-based evaluation.

Pressure-Based Sample Elution Setup and Fabrication

After injection of the sample into the spray-capillary 102, the gas injection assembly 104 was utilized to apply pressure-based sample elution for the follow-up MS detection. Nitrogen from the source of pressurized gas 134 was injected through the gas injection line 136, through the third branch 144 into the upstream connector 132, where it was carried by the gas transfer line 138 into the sample vial 200. Pressure in the sample vial 200 was consequently generated. The sample inlet end 114 of the spray-capillary 102 was inserted into the glass sample vial 200 with a rubber cap to seal the vial inlet when pressure was applied. The increased pressure within the sample vial 200 encouraged the movement of the sample inside the spray capillary 102 towards the discharge end 112. A gas gauge (0-3 psi) was used to control nitrogen pressure for sample elution.

Mass Spectrometry Analysis

An LTQ Orbitrap Elite mass spectrometer was utilized for related spray-capillary experiments. The temperature of the inlet capillary was 275° C. For pressure elution experiments, both 2+ and 3+ AngII ions were targeted with two scan ranges: 523-527 m/z for 2+ ions, and 348-352 m/z for 3+ ions. Both scans were acquired at the resolving power of 120,000 at m/z=400. All data files were collected in profile mode. Peak extraction was done in XCalibur using RAW files. Results were processed and plotted using GraphPad Prism. In addition, chromatograms extracted from raw data were processed using boxcar smoothing algorithms.

System Parameters

Figure 11A:
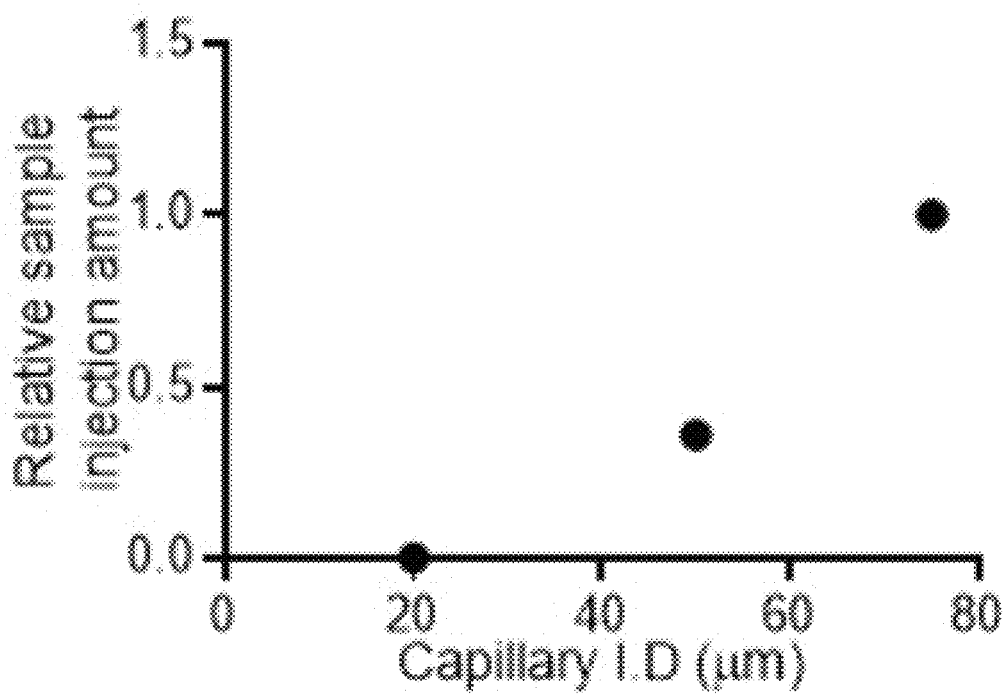
FIG. 11A shows an evaluation of spray-capillary performance as a function of capillary inner diameter.
Figure 11B:
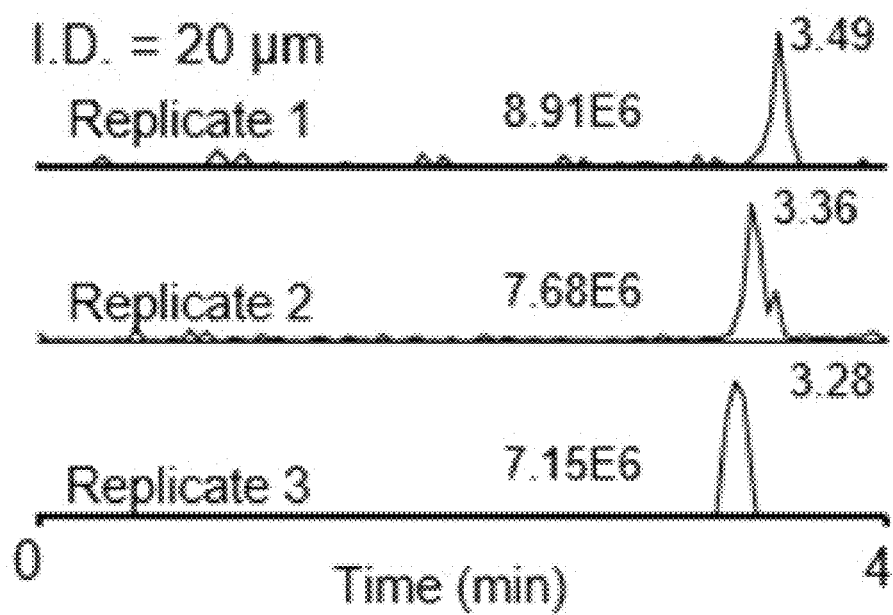
FIG. 11B shows the injection reproducibility of low-volume sample at nL level sample (~2.9 nL) using a spray-capillary device coupled to MS.
Figure 11C:
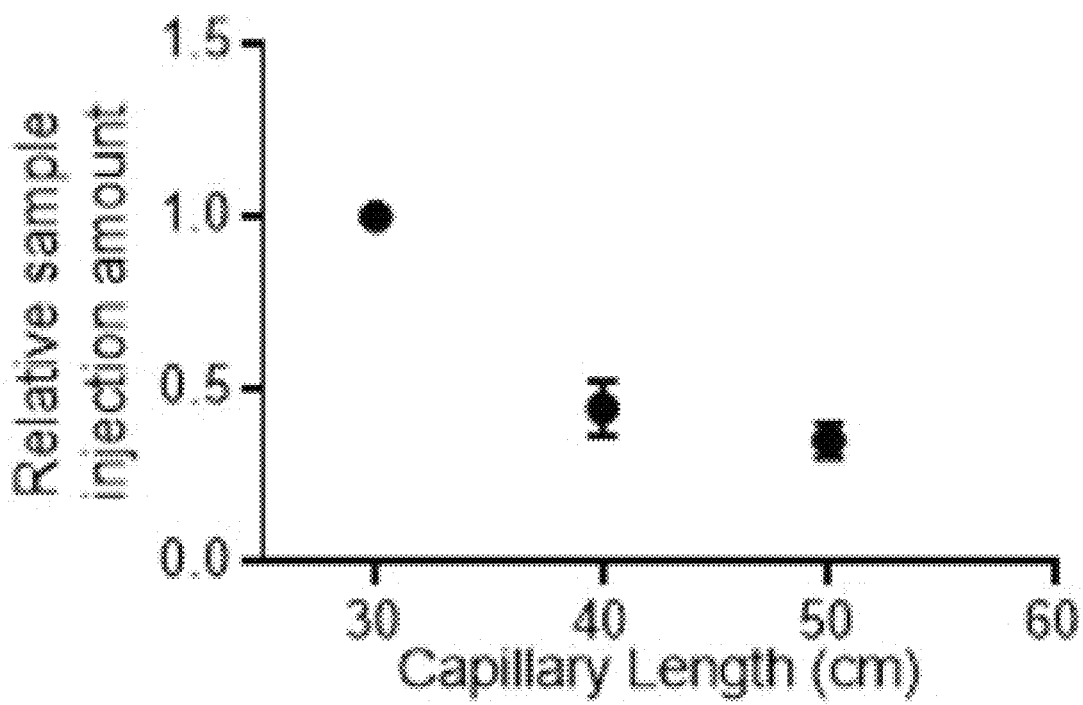
FIG. 11C shows an evaluation of spray-capillary performance as a function of capillary length
Figure 11D:
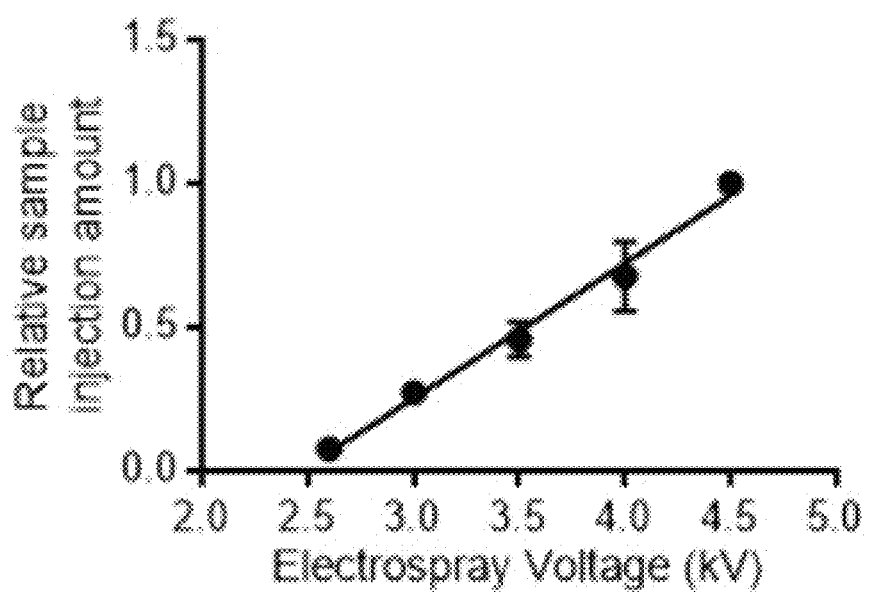
FIG. 11D shows an evaluation of spray-capillary performance as a function of electrospray voltage.

Several other parameters can be tuned to vary the rate of sample injection, such as capillary inner diameter, capillary length, and ESI voltage. (1) Capillary inner diameter: we evaluated the performance of the spray-capillary device 100 with a 50 cm length spray capillary 102 with 20 μm, 50 μm, and 75 μm I.D. The sample injection time was 60 s for all spray capillaries 102. The results suggested that the sample injection volume increased as the spray-capillary inner diameter increased (FIG. 11A). FIG. 11B shows a relatively high reproducibility (RSD=11.3%) of detected MS signals for spray-capillary injections with 20 μm I.D. The sample injection rate was calculated using the spray-capillary with 20 μm I.D. using camera monitoring. The estimated injection rate is 15.0 pL/s without vacuum and 48.2 pL/s when the spray-capillary was placed in front of the inlet to the MS detection device 202. Some discontinuity in the peak shape and deviations from linearity was observed as the spray-capillary parameters were varied, which may be cause by the fluctuations of the $N_2$ source. The flow resistance at the interface between the sample and running buffer under pressure may also contribute to some of the observed variation. (2) Spray-capillary length: Spray-capillaries 102 (360 μm O.D.×50 μm I.D.) with different lengths (30 cm, 40 cm, and 50 cm) were used to determine the effect of spray-capillary length on injection volume. To minimize potential errors, the same spray-capillary 102 was used for all the experiments by trimming the capillary from the sample inlet end 114 to produce the desired capillary lengths while the same MS discharge end 112 was used. The strength of the MS signal decreased as the length of the spray-capillary increased, FIG. 11C. This inverse trend is likely due to the result of the longer plug of the column liquid present in longer capillaries, which leads to a stronger friction force and lower injection flow rate. (3) ESI voltage: A 50 cm spray-capillary with 360 μm O.D.×50 μm I.D. was used to perform a series of experiments at varying electrospray voltages (between 2.6 kV and 4.5 kV) (FIG. 7D). 2.6 kV was the lowest ESI voltage determined to produce stable electrospray with the 50 μm I.D. spray-capillary. 4.5 kV was the highest ESI voltage selected because arcing started to affect the ESI process when the voltage was raised beyond this limit. The 2.6 kV and 4.5 kV voltages are not limiting parameters for other possible embodiments since an embodiment with a different detection system than presently described can produce stable electrospray results under different ESI voltages than those presently described. A linear relationship was found between injection volume and electrospray voltage. The formation of the cone-jet depends on the balance between the surface tension of the spraying liquid and the electric field force. Therefore, a linear relationship between sample injection volume and ESI voltage is expected because, when electrospray voltage increases, the electric field force increases as well, resulting in a higher sample injection rate.

Example 3—Sample Injection and Peptide Separation

Figure 13A:
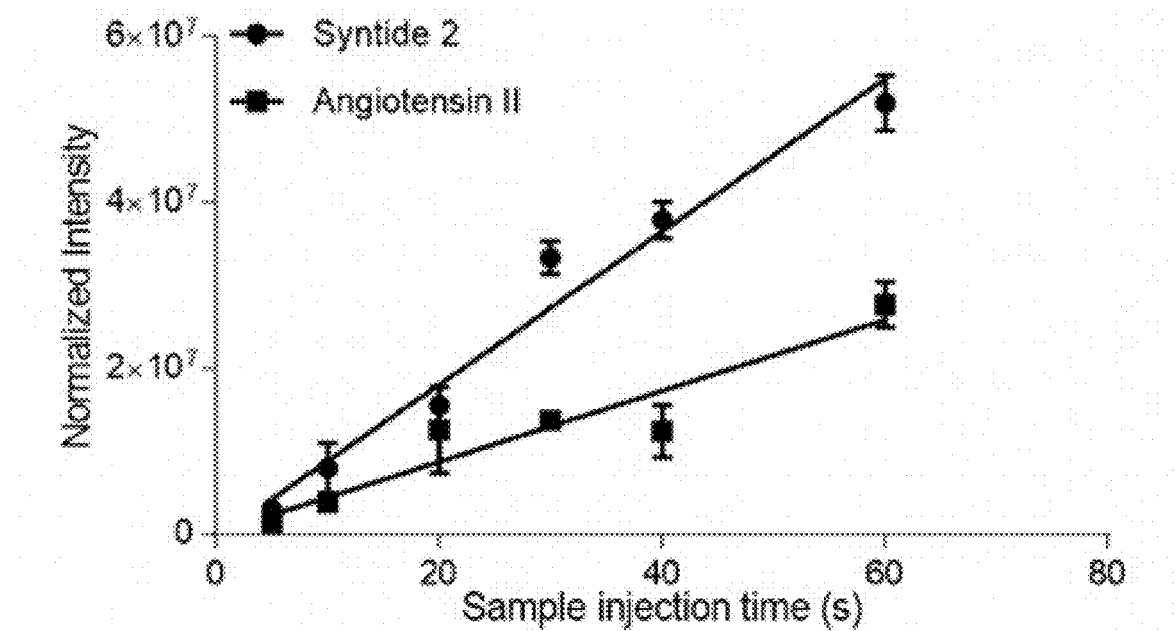
FIG. 13A shows a calibration curve of standard peptides separation using the spray-capillary CE-MS platform. (N=3 for each experiment condition).
Figure 13B:
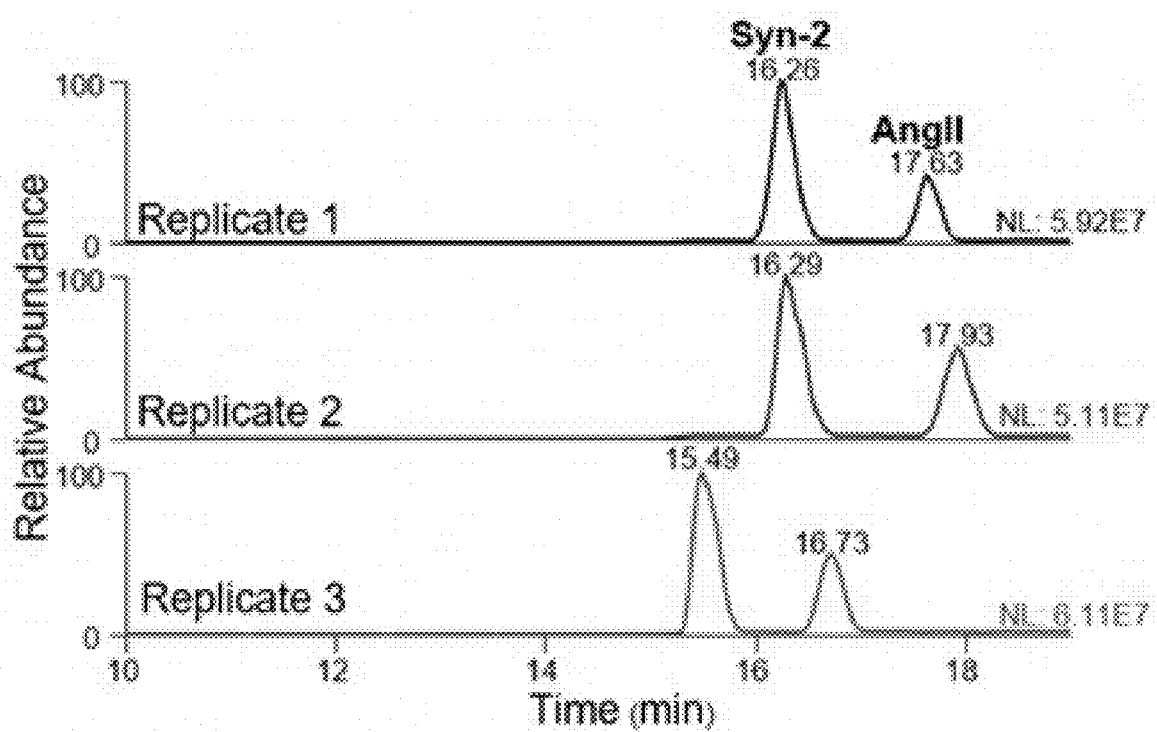
FIG. 13B shows the reproducibility of peptide separation using the spray-capillary CE-MS platform. Sample injection time is 60 s for all replicates.
Figure 13C:
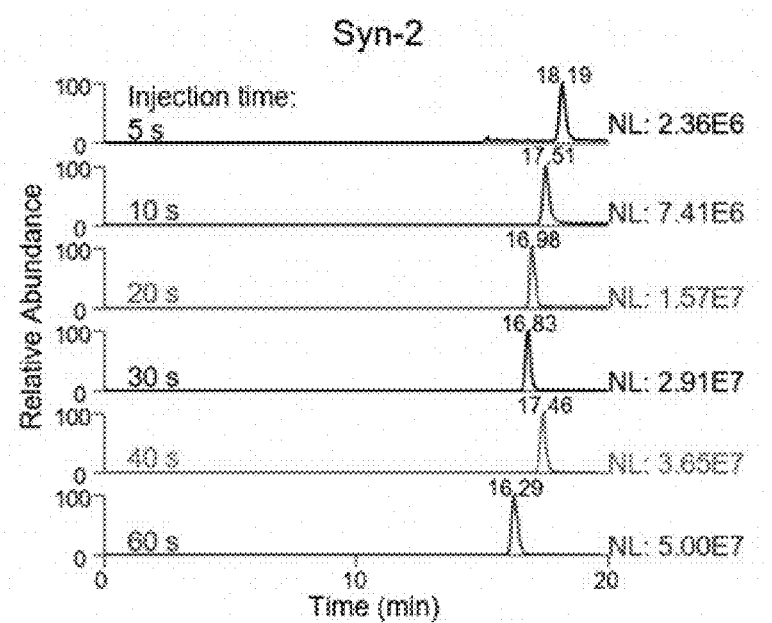
FIG. 13C shows the EICs of Syn-2 (m/z=503.30–503.37) with different sample injection times.
Figure 13D:
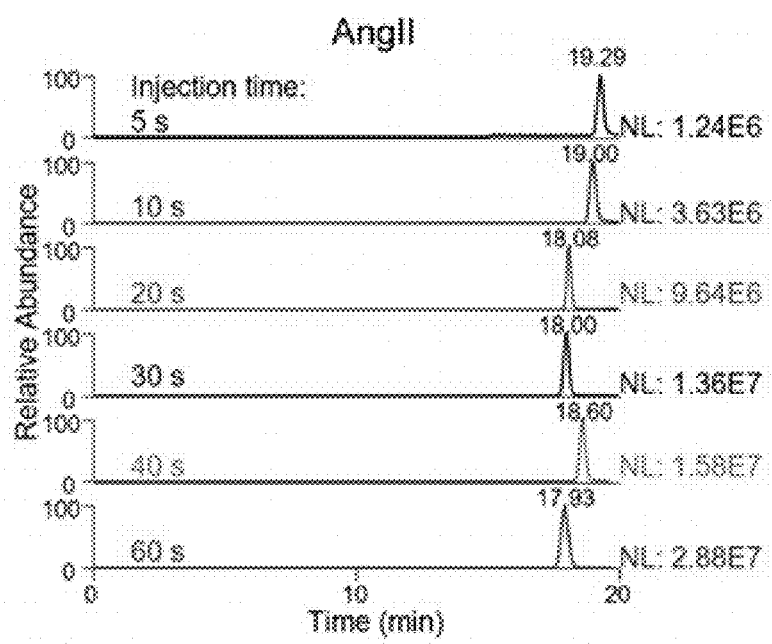
FIG. 13D shows the EICs of AngII (m/z=523.77–523.80) with different sample injection times.

In another embodiment, the present disclosure provides a new method of direct coupling of the spray capillary 102 with a CE-MS platform. One advantage of the spray-capillary device 100 is its ability to directly serve as the CE separation column after sample injection. The spray-capillary device 100 can be directly coupled to the MS detection device 202 to produce an online spray-capillary CE-MS platform. We tested the performance of the spray-capillary CE-MS using a standard peptide mixture (10 μM AngII and 10 μM Syn-2). A bare spray-capillary (50 cm in length, 360 μm O.D., 50 μm I.D.) was used for these experiments. For sample injection, the ESI voltage was set at 3 kV, and the sample injection time was varied from 5 to 60 s (N=3 for each condition). Baseline separation was achieved for these two peptides under these conditions. Reasonably good reproducibility was observed for both CE-MS elution time (RSD=9.3%) and extract ion intensities of individual peptides (RSD=6.64% for Syn-2 and RSD=9.71% for AngII) shown in FIGS. 13A-D. In addition, a good linear relationship between detected signals and sample injection time were detected for both AngII ($R^2$=0.93) and Syn-2 ($R^2$=0.97), indicating that spray-capillary 102 is capable of quantitative sample injection when coupled with the CE-MS platform shown in FIG. 13A. The reproducibility of peptide separation using the spray-capillary CE-MS platform, and an injection time of 60 s, is shown in FIG. 13B. The results of EICs of Syn-2 (m/z=503.30-503.37) with different injection times is shown in FIG. 13C. The results of EICs of AngII (m/z=523.77-523.80) with different injection times is shown is FIG. 13D.

In the present work, the calculated theoretical plate number of Angiotensin II was approximately 30,000, which is lower than recent CE studies using the same peptide (~300, 000). To improve the separation resolution for complex sample analysis, several improvements to the CE separation can be made. For example, experiments that utilize a longer spray capillary 102 with a smaller inner diameter combined with higher applied voltages have resulted in higher sensitivity and resolution separations of peptides and metabolites. These experiments have also demonstrated utility when the sample is limited, such as in the analysis of single cells. In addition, high-quality capillary coatings, such as linear polyacrylamide (LPA), have been used to improve separation power by eliminating EOF. The performance of the spray-capillary device 100 may be evaluated and improved using the modifications described above to achieve better quantitative results.

The detection limit for reproducible sample injection volume was estimated based on data collected using 3 kV ESI voltage and 5 s sample injection. The sample injection flow rate (57.8 pL/s) was estimated using the previously described video-monitoring approach. For the 3 kV and 5 s sample injection, the total injected sample volume was 290 pL, and the injection amount of each peptide was about 2.9 fmol. The estimated average detection limits were calculated through extrapolation and were found to be 17 amole and 65 amole for Syn-2 and AngII, respectively shown in FIG. 14. The highly reproducible separation performance of the standard peptide mixture indicates the spray-capillary device 100 can be a useful tool to analyze complex biological samples with optimized CE conditions such as longer columns or coated capillaries.

CE Separation of Standard Peptide Mixtures

In a non-limiting embodiment, the spray-capillary device 100 can be coupled directly with a CE-MS system 202 to separate standard peptides. A spray-capillary (360 μm O.D., 50 μm I.D., 50 cm in length) was used for the CE separation of standard peptide mixtures. The MS discharge end 112 of the spray-capillary 102, with a 3 cm porous section 110, was inserted into the sheathless interface (downstream connector 116), as described above for spray-capillary-based sample injection. Then the sample inlet end 114 was inserted into the sample vial 200. After sample injection, the sample inlet end 114 of the spray-capillary 102 was inserted into a container 200 with the BGE solution (0.1% FA). The CE separation was then conducted by applying 15 kV (300 V/cm) at the sample inlet end 114. The 15 kV utilized for this experiment is not a limiting parameter. The working range can be 10-30 kV depending on the length of capillary utilized and the exact experimental configuration. High voltage (HV) from the power supply 146 was applied to the sample injector (upstream connector 132) using an alligator clip connected to the upstream lead 152 immersed in the BGE in the vial 200. The upstream connector 132 was constructed as depicted in FIG. 2. Stainless-steel components are not a limiting requirement of the disclosed method and system, the method and system works using components that are conductive and configured to carry a voltage signal. The described examples and embodiments utilize stainless-steel components due to the cost effective, non-oxidizing nature (copper, an oxidizing conductor can also be used). After a 15 min CE separation, $N_2$ was introduced by the gas injection assembly 104 at low pressure, typically 0 psi-3 psi with typical operating pressure around 1-2 psi, to elute peptides. 2.6 kV was used for the electrospray ionization at the sheathless interface. The 2.6 kV utilized for these experiments is not a limiting parameter. The expected normal operating range is 1.5 kV-5 kV depending on the specific detection system utilized. For the CE-MS experiments, full MS scans were acquired at the resolving power of 120,000 at m/z=400, and the AGC target was set as 1E6 with the maximum ion injection time of 1000 milliseconds (ms). The scan range is 150-2000 m/z.

In another non-limiting embodiment, the spray-capillary device 100 is characterized offline, monitored with a high resolution digital monitor. This embodiment can be replicated with or without a vacuum force to validate the results.

Example 4—Single Cell Sampling

In another non-limiting embodiment, the embodiment described in Example 1 can be replicated using a sharp tip at the sample inlet end 114 of the spray capillary 102. This tip of the inlet end 114 can be sized to accommodate samples of only a single cell. The sampling system and method of the present disclosure is designed to be adjustable and the components interchangeable to accomplish a number of non-proprietary lab setups. The result is low cost experimental methods for quantitative, ultra low sample applications.

While the present disclosure has been described in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the presently disclosed methods and compositions. Changes may be made in the structures of the various components described herein, or the methods described herein without departing from the spirit and scope of the present disclosure.

It is claimed:

1. An apparatus for measuring an ultra low-volume sample, comprising:
    (1) a spray capillary, wherein the spray capillary comprises an inlet end having a non-porous tip, positioned to receive the ultra low-volume sample from a container 200, and a tapered discharge end having a porous section, wherein the spray capillary 102 is configured to contain the ultra low-volume sample, wherein the porous section is configured to exert an electric force on the spray capillary;
    (2) an upstream connector comprising a first branch, a second branch, a third branch, and an upstream lead conductor, wherein the spray capillary is positioned within the upstream connector, extending from the first branch through the second branch, wherein the non-porous tip of the first inlet end of the spray capillary is positioned to receive the ultra low-volume sample, wherein the upstream lead conductor is positioned adjacent to the non-porous tip of the inlet end of the spray capillary and extends perpendicular to the upstream connector at the first branch, and wherein the third branch is configured to receive a gas;
    (3) a downstream connector comprising a first branch, a second branch, a third branch, and a conductive interface, wherein the tapered discharge end of the spray capillary is positioned within the downstream connector such that the tapered discharge end of the spray capillary is inserted into the first branch and exits from the second branch, wherein the third branch 128 of the downstream connector inlet is configured to receive a conductive liquid from the source of conductive liquid such that the conductive liquid surrounds the tapered and porous discharge end of the spray capillary, and wherein the conductive interface is configured for contact with the conductive substance, and wherein the conductive interface is configured to receive an electric signal; and
    wherein, responsive to the conductive interface of the downstream connector receiving the electric signal, the conductive interface forms a pressure differential between the inlet end of the spray capillary and the tapered discharge end of the spray capillary.

2. The apparatus of claim 1, wherein the first connector is configured with the second inlet positioned perpendicular to the first inlet and the first output end of the first connector; and
    wherein the second connector is configured with the fourth inlet positioned perpendicular to the third inlet and the second output end of the second connector.

3. The apparatus of claim 1, wherein the capillary is constructed of fused silica.

4. The apparatus of claim 1, wherein the capillary is fabricated as a sheathless interface comprising an outer polymer coating which extends to the porous tip, which is free of the outer polymer coating.

5. The apparatus of claim 1, wherein the capillary has a length in a range between 10 cm and 200 cm.

6. The apparatus of claim 1, wherein the conductor is secured with a gasket, positioned at the first inlet of the first connector.

7. The apparatus of claim 1, wherein the gas is nitrogen.

8. A method for processing an ultra low-volume sample, comprising the steps of:
    providing spray-capillary device, comprising:
    (1) a spray capillary, wherein, the spray capillary comprises an inlet end having a non-porous tip, positioned to receive the ultra low-volume sample, and a tapered discharge end with a porous section, the spray capillary configured to contain the ultra low-volume sample, wherein the tapered discharge end is configured to exert an electric force, wherein upon receiving the electric force; the tapered discharge end is configured to discharge an electrospray, wherein upon discharge of the electrospray, a pressure differential is exerted on the spray capillary configured to contain the ultra low-volume sample;

(2) a first upstream connector comprising a first branch, a second branch, a third branch, and an upstream lead conductor, wherein the spray capillary is positioned within the upstream connector, extending from the first branch through the second branch, wherein the non-porous tip of the inlet end of the spray capillary is positioned to receive the ultra low-volume sample and enter the inlet end, wherein the upstream lead conductor is positioned adjacent to the non-porous tip of the inlet end of the spray capillary, and wherein the third branch is configured to receive a gas;

(3) a second downstream connector comprising a first branch, a second branch, a third branch, and a conductive interface, wherein the tapered discharge end of the spray capillary is inserted into the first branch of the downstream connector and exits out of the second branch of the downstream connector, wherein the third branch of the downstream connector is configured to receive a conductive substance that surrounds the porous section discharge end of the spray capillary, and wherein the conductive interface is configured to receive an electric signal;

introducing the ultra low-volume sample into the inlet end of the spray capillary;

injecting the conductive substance into the third branch of the downstream connector, wherein the conductive substance passes out of the second branch of the downstream connector; and applying the electric signal to the conductive interface of the downstream connector for forming the pressure differential between the inlet end of the spray capillary and the tapered discharge end of the spray capillary; thereby forming the electrospray, causing the ultra low-volume sample to be injected into the inlet end the spray capillary.

9. The method of claim 8 comprising introducing the electrospray into an analytic detection device for analysis of the ultra low-volume sample.

10. The method of claim 8, further comprising applying a vacuum to an analytic detection device assembly after introducing the ultra low-volume sample into the spray capillary.

11. The method of claim 8, wherein the electric signal is applied to the downstream connector to provide a voltage in a range between 1.5 kV and 5 kV.

12. The method of claim 8, wherein the upstream connector is configured with the third branch is positioned perpendicular to the first branch and the second branch of the upstream connector; and wherein the downstream connector is configured with the third branch positioned perpendicular to the first and second branches of the downstream connector.

13. The method of claim 8, wherein the spray capillary is constructed of fused silica.

14. The method of claim 8, wherein the spray capillary has an inner sheathless interface and an outer polymer coating which extends to the porous section, which is free of the outer polymer coating.

15. The method of claim 8, wherein the spray capillary has a length in a range between 30 cm and 100 cm.

16. The wherein the conductor is secured with a gasket, positioned at the first branch of the upstream connector.

17. The method of claim 8, wherein the spray capillary has an inner diameter in a range between 20 μm and 75 μm.

18. The method of claim 8, wherein the inlet end of the spray capillary is configured to retrieve a single cell sample.

19. The method of claim 8, further comprising separating one or more peptides.

20. The method of claim 19, wherein the step of separating the one or more peptides comprises:

inserting the inlet end into an electrolyte solution; and applying a voltage signal to the conductor, wherein the conductor is positioned in the electrolyte solution.

* * * * *